(12) United States Patent
Takahashi et al.

(10) Patent No.: US 12,433,829 B2
(45) Date of Patent: Oct. 7, 2025

(54) AGENT FOR ENHANCING LUTEIN'S BLUE LIGHT BLOCKING CAPACITY, AND COSMETIC COMPOSITION

(71) Applicant: TAIKI CORP., LTD., Osaka (JP)

(72) Inventors: Makoto Takahashi, Osaka (JP); Hiroto Toshima, Osaka (JP)

(73) Assignee: TAIKI CORP., LTD., Osaka (JP)

( * ) Notice: Subject to any disclaimer, the term of this patent is extended or adjusted under 35 U.S.C. 154(b) by 849 days.

(21) Appl. No.: 17/768,402

(22) PCT Filed: Nov. 16, 2020

(86) PCT No.: PCT/JP2020/042660
§ 371 (c)(1),
(2) Date: Apr. 12, 2022

(87) PCT Pub. No.: WO2021/106657
PCT Pub. Date: Jun. 3, 2021

(65) Prior Publication Data
US 2023/0067907 A1    Mar. 2, 2023

(30) Foreign Application Priority Data
Nov. 29, 2019    (JP) .................. 2019-216474

(51) Int. Cl.
*A61K 8/55* (2006.01)
*A61K 8/31* (2006.01)
*A61K 8/42* (2006.01)
*A61Q 17/04* (2006.01)

(52) U.S. Cl.
CPC .................. *A61K 8/55* (2013.01); *A61K 8/31* (2013.01); *A61K 8/42* (2013.01); *A61Q 17/04* (2013.01); *A61K 2800/592* (2013.01)

(58) Field of Classification Search
CPC ... A61K 8/55; A61K 8/31; A61K 8/42; A61K 2800/592; A61Q 17/04
USPC ........................................................ 514/75
See application file for complete search history.

(56) References Cited

U.S. PATENT DOCUMENTS

| | | |
|---|---|---|
| 2008/0199413 A1 | 8/2008 | Goralczyk et al. |
| 2018/0133125 A1 | 5/2018 | Kim et al. |

FOREIGN PATENT DOCUMENTS

| | | |
|---|---|---|
| CN | 106726975 A | 5/2017 |
| CN | 107693395 A | 2/2018 |
| CN | 109172448 A | 1/2019 |
| EP | 3590360 A4 | 2/2021 |
| JP | H0525028 A | 2/1993 |
| JP | H0925209 A | 1/1997 |
| JP | 2013177367 A | 9/2013 |
| JP | 2015044773 A | 3/2015 |
| JP | 2016222612 A | 12/2016 |
| JP | 2018519260 A | 7/2018 |
| JP | 2019099580 A | 6/2019 |
| WO | 2007009657 A1 | 1/2007 |
| WO | 2019026970 A1 | 2/2019 |

OTHER PUBLICATIONS

International Search Report (ISR) mailed Jan. 19, 2021, issued for International application No. PCT/JP2020/042660. (2 pages).
Mintel GNPD [online], Energising Cream mask, Jul. 2019, retrieval date Dec. 17, 2020, Internet: https://portal.mintel.com/ . (4 pages).
A Written Opinion issued by the Intellectual Property Office of Singapore with a Search Report, dated Aug. 20, 2024, for counterpart application No. 11202204318Y (10 pages).
Aize Kijlstra et al: "Lutein: More than just a filter for blue light", Progress in Retinal and Eye Research, vol. 31, No. 4, Mar. 21, 2012 (Mar. 21, 2012), pp. 303-315, XP028509122, ISSN: 1350-9462, DOI: 10.1016/J.PRETEYERES.2012.03.002 [retrieved on Mar. 21, 2012] (13 pages).
Database GNPD [Online] Mintel; May 18, 2011 (May 18, 2011), anonymous: "Face and Body Cream SPF 15", XP093092510, Database accession No. 1805661 (3 pages).
Database GNPD [Online] Mintel; Jul. 19, 2019 ( Jul. 19, 2019), Suiss Vitale: "Energising Cream Mask", XP055830619, Database accession No. 6679075 (7 pages).
Extended European Search Report (EESR) dated Oct. 31, 2023, issued for European counterpart patent application No. EP20891921.7 (6 pages).
A Request for the Submission of an Opinion issued by Korean Intellectual Property Office on Mar. 26, 2025, for Korean counterpart application No. 10-2022-7012415 (4 pages).
Roberts et al., Journal of Ophthalmology, 2015 year, vol. 5, the p. 1-8 one copy. (8 pages).
Suiss Vitale, switzerland, energising Cream Mask, Mintel GNPD [Online], Jul. 2019 URL:https: the//portalmintel.com (Database accession No. 6679075) one copy. (16 pages).
International Preliminary Report on Patentability, dated May 17, 2022, for corresponding international application PCT/JP2020/042660 (1 page).
Notification Concerning Transmittal of International Preliminary Report on Patentability, mailed Jun. 9, 2022, for corresponding international application PCT/JP2020/042660 (1 page).
Notification of Transmittal of Translation of the International Preliminary Report on Patentability, mailed Jun. 9, 2022, for corresponding international application PCT/JP2020/042660 (1 page).

(Continued)

*Primary Examiner* — Kristin A Vajda
(74) *Attorney, Agent, or Firm* — Law Office of Katsuhiro Arai

(57) ABSTRACT

An object is to provide a new cosmetic composition that can prevent or reduce skin "photoaging" caused by blue light. As a solution, a cosmetic composition is provided, which is characterized in that it contains: (a) one or more types of alkyl phosphate esters selected from alkyl phosphate esters having alkyl groups with 12 to 36 carbon atoms; (b) one or more types of substances selected from basic amino acids and organic bases; (c) water; and (d) lutein.

4 Claims, 1 Drawing Sheet

(56) References Cited

OTHER PUBLICATIONS

Written Opinion of the International Searching Authority, mailed Jan. 19, 2021, for corresponding international application PCT/JP2020/042660 (3 page).

"Missha Vitamine B12 Double Hydrop Booster", https://www.nmpa.gov.cn/datasearch/otherinfo.html?nmpa=dXJsPWZmODA4MDgxODA0NjUwMmYwMTgwZjk1MTIjMTU0MTgxL2RldGFpbC5odG1sJmlkPTI4NzkxMiZpdGVtSWQ9ZmY4MDgwODE4MDQ2NTAyZjAxODBmOTUxOWMxNTQxODE=, pp. 1-6, Jun. 10, 2019 (6 pages).

A First Office Action issued by the State Intellectual Property Office of China on May 27, 2023, for Chinese counterpart application No. 202080071720.0 (11 pages).

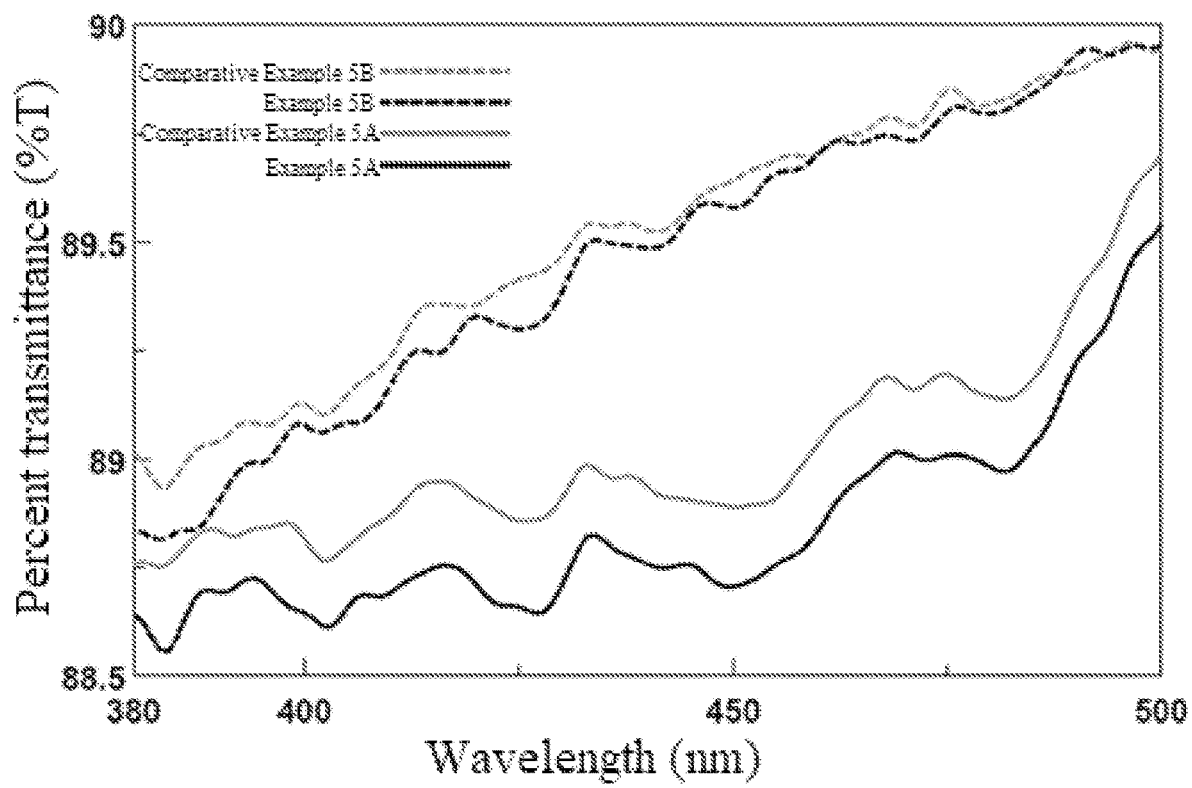

AGENT FOR ENHANCING LUTEIN'S BLUE LIGHT BLOCKING CAPACITY, AND COSMETIC COMPOSITION

CROSS-REFERENCE TO RELATED APPLICATIONS

This application is the U.S. National Phase under 35 U.S.C. § 371 of International Application PCT/JP2020/042660, filed Nov. 16, 2020, which claims priority to Japanese Patent Application No. JP2019-216474, filed Nov. 29, 2019. The International Application was published under PCT Article 21(2) in a language other than English.

TECHNICAL FIELD

The present invention relates to an agent for enhancing lutein's blue light blocking capacity, and a cosmetic composition containing this enhancing agent and lutein.

BACKGROUND ART

Brown spots, wrinkles, saggy skin, etc., caused by continuous exposure to sunlight are the results of skin "photoaging," and it is said that this "photoaging" is responsible for approx. 80 percent of skin aging while advancing age is responsible for approx. 20 percent. Key causes of skin "photoaging" include ultraviolet rays (UV-A, UV-B), blue light, and near-infrared rays in the sunlight. Blue light, which is also called "the third ultraviolet ray," is a blue-colored light having the shortest wavelengths among the visible rays, and it is cited as a cause of age-related macular degeneration over time. Also, blue light has longer wavelengths than ultraviolet rays and thus possesses strong energy closest to that of ultraviolet rays, which means that blue light reaches deeper in the skin than ultraviolet rays can, purportedly triggering melanin production and pigmentation that cause brown spots and dull skin. Since LED displays on personal computers and smartphones as well as LED illumination are rich sources of this blue light, people living in today's modern age are in an environment where they are constantly exposed to blue light daily, for many hours, regardless of the season.

Given this environment, cosmetics containing additive ingredients that block blue light, and cosmetics compounded with ingredients that reduce the effects of blue light, have been proposed lately, for example. For example, Patent Literature 1 below proposes a cosmetic composition that contains jade powder as an active ingredient, based on the effect of jade powder to block (reflect) blue light. Also, Patent Literature 2 below proposes a cosmetic composition that contains bilberry extract as an active ingredient, based on the effect of an extract from bilberry, which is a type of blueberry, to prevent skin cell growth inhibition caused by blue light irradiation.

However, these cosmetic compositions are not yet proven sufficiently effective, and new proposals are desired that can sufficiently prevent or reduce skin "photoaging" caused by blue light.

BACKGROUND ART LITERATURE

Patent Literature

Patent Literature 1: Japanese Patent Laid-open No. 2018-519260

Patent Literature 2: Japanese Patent Laid-open No. 2015-044773

SUMMARY OF THE INVENTION

Problems to be Solved by the Invention

An object of the present invention is to provide a new cosmetic composition that can prevent or reduce skin "photoaging" caused by blue light.

Means for Solving the Problems

As a result of repeated studies conducted in earnest to achieve the aforementioned object, the inventor of the present invention found that an α-gel structure having a specific composition would enhance the blue light blocking capacity possessed by lutein, and achieved the aforementioned object.

Specifically, the key points of the present invention are as follows:

1. An agent for enhancing lutein's blue light blocking capacity, characterized in that it contains components (a) to (c) below:
    (a) one or more types of alkyl phosphate esters selected from alkyl phosphate esters having alkyl groups with 12 to 36 carbon atoms;
    (b) one or more types of substances selected from basic amino acids and organic bases; and
    (c) water.
2. A cosmetic composition characterized in that it contains components (a) to (d) below:
    (a) one or more types of alkyl phosphate esters selected from alkyl phosphate esters having alkyl groups with 12 to 36 carbon atoms;
    (b) one or more types of substances selected from basic amino acids and organic bases;
    (c) water; and
    (d) lutein.
3. The cosmetic composition according to 2, characterized in that the lutein as component (d) is contained by 0.0025% by weight relative to the total quantity of cosmetic composition.

Effects of the Invention

The present invention is one based on the new knowledge that an α-gel structure obtained by combining a specific alkyl phosphate ester with a specific base enhances the blue light blocking capacity possessed by lutein, and it demonstrates excellent effects.

The cosmetic composition obtained by the present invention is useful in that it can enhance blue light blocking capacity possessed by lutein and reduce the impact that blue light—a cause of skin "photoaging"—has on the skin, without having to increase the additive quantity of lutein.

Also, the cosmetic composition obtained by the present invention can contain a lot of water by building an α-gel structure through combination of components (a) and (b) conforming to the present invention, and also uses no higher alcohols unlike traditional α-gel structures, the result of which is a cosmetic that is not very sticky but dry to the touch, and thus feels good to use.

BRIEF DESCRIPTION OF THE DRAWINGS

FIG. 1 A graph showing the blue light percent transmittances (% T) at wavelengths of 380 to 500 nm, of each of the cosmetic composition test samples of Examples 5A and 5B and cosmetic composition test samples of Comparative Examples 5A and 5B, in "Confirmation Test for Effect of Enhancing Blue Light Blocking Capacity" under "Examples."

MODE FOR CARRYING OUT THE INVENTION

The present invention relates to an agent for enhancing lutein's blue light blocking capacity, as well as a cosmetic composition containing this enhancing agent and lutein.

Under the present invention, blue light refers to a blue-colored light having a wavelength in a range of 380 to 500 nm.

The present invention is explained below in detail.
<Lutein>
Lutein is a plant pigment, xanthophyl, and also dihydroxy carotenoid, being a natural pigment of yellow color having an antioxidative action. Petals of marigold and other yellow flowers, green and yellow vegetables such as spinach, carrots, and pumpkin, and green leaves of plants, are rich sources of lutein which is a compound whose properties to reduce oxygen radicals that cause aging of the eyes, and absorb blue light of around 445 nm in wavelength, are public knowledge. The IUPAC name of lutein is ß,ε-carotene-3,3'-diol that represents a compound having the chemical structure shown below.

Under the present invention, component (a) and component (b) may be compounded to a total quantity in a range of 0.5 to 99.0% by weight relative to the total quantity of agent for enhancing lutein's blue light blocking capacity or cosmetic composition. Of this, component (a) is compounded preferably by a range of 0.3 to 85.0% by weight, or more preferably by a range of 2.0 to 35.0% by weight. Component (b) is compounded preferably by a range of 0.10 to 48.0% by weight, or more preferably by a range of 0.25 to 28.5% by weight. Furthermore, preferably the compounding quantity of component (b) relative to component (a) is 0.5 to 1.5 equivalent.

The cosmetic composition proposed by the present invention may be prepared as compositions having different viscosities according to the compounding quantities of component (a) and component (b), and, to prepare a composition having a viscosity of approx. 10000 to 50000 mPa·s, for example, preferably the total quantity of component (a) and component (b) is 0.5% by weight or more.
<Component (c)>
The present invention contains water as component (c). Water is generally used in cosmetics in the form of, specifically, ion-exchanged water, distilled water or other purified water, tap water, natural water, alkaline ion water, etc.
<α-gel Structure>
Component (a) conforming to the present invention forms a "salt," which is an amphipathic substance having excellent

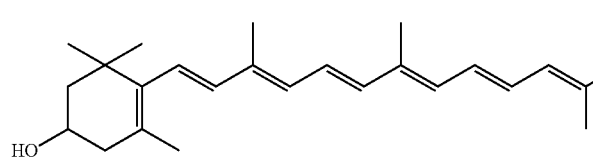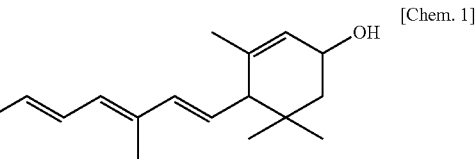

[Chem. 1]

<Component (a)>
The present invention contains component (a) constituted by one or more types of alkyl phosphate esters selected from alkyl phosphate esters having alkyl groups with 12 to 36 carbon atoms. Component (a) conforming to the present invention is preferably a monoalkyl phosphate ester, or more preferably one whose monoester content is 95% or higher. Also, its alkyl groups are preferably alkyl groups with 12 to 30 carbon atoms, or more preferably alkyl groups with 14 to 22 carbon atoms, or most preferably alkyl groups with 14 to 18 carbon atoms. Furthermore, preferably the alkyl groups are of straight-chain type.

Component (a) conforming to the present invention may be obtained by, for example, synthesizing a monoalkyl phosphate ester according to the manufacturing method described in "Journal of Japan Oil Chemists' Society, vol. 15, no. 11, 1966, pp. 598-600."
<Component (b)>
The present invention contains component (b) constituted by one or more types of substances selected from basic amino acids and organic bases. Specific examples of basic amino acids include, for example, arginine, ricin, histidine, tryptophan, etc. Specific examples of organic bases include, for example, monoethanolamine, diethanolamine, triethanolamine, aminomethyl propanol, aminomethyl propanediol, aminoethyl propanediol, tris-hydroxymethyl aminomethane, etc. Among these, basic amino acids are preferred, and arginine is particularly preferred.

structural stability in water, together with component (b) being a specific neutralizer, as explained in detail in "Examples" below. In a solid crystal state, this amphipathic substance, or "salt," does not change when dispersed in water, but as the temperature rises, it changes to a gel state and forms an α-gel structure as the lamellar layer swells. This formation of an α-gel structure causes the viscosity of the solution to increase significantly, resulting in a stable high-water-content structure.

Here, an α-gel structure is a structure characterized by a regular array and feel of a solid matter. An α-gel structure can retain a lot of water inside, and thus possesses high occlusive property and moisture-retention property. While a number of studies have been conducted to combine a higher alcohol with a hydrophilic nonionic surfactant to form an α-gel structure with the aim of improving the functionality of drug formulations and how they feel, the α-gel structure under the present invention is formed by a surfactant only without using higher alcohol, and therefore is not very sticky but dry to the touch.

To be specific, the α-gel structure can be formed by heating components (a) to (c) conforming to the present invention to approx. 80° C. and mixing them uniformly, and then cooling the mixture to room temperature (approx. 25° C.) under agitation.

Details are unclear as to the mechanism of how lutein's blue light absorbing capacity, or specifically blue light blocking capacity, is enhanced by combining the α-gel structure based on components (a) to (c) conforming to the present invention with lutein; however, it is presumed that, because the α-gel structure based on components (a) to (c) conforming to the present invention has a regular array, lutein is aligned or oriented with certain regularity, allowing its blue light absorbing capacity to be enhanced.

<Other Components>

To the extent that doing so does not reduce the effects of the present invention, various components normally used in cosmetics or dermatologic agents for external use, such as oil components, moisture-retention components, surfactants, thickening agents, stabilizers, pigments, aromatics, etc., may be compounded into the agent for enhancing lutein's blue light blocking capacity or into the cosmetic composition proposed by the present invention.

Oil components are not limited in any way so long as they can be compounded into cosmetics, and they may be naturally derived or synthesized, and may be liquid or solid.

Specific Examples Include, for Example avocado oil, turtle oil, corn oil, almond oil, olive oil, cacao oil, sesame oil, safflower oil, soybean oil, *camellia* oil, persic oil, castor oil, grapeseed oil, macadamia nut oil, mink oil, cottonseed oil, Japan wax, coconut oil, egg yolk oil, palm oil, palm kernel oil, glyceryl triisooctanoate, glyceryl tri-2-ethylhexanoate, glyceryl tri (caprylate/caprate/myristate/stearate), cholesterol fatty acid ester, wheat germ oil, sasanqua oil, flaxseed oil, evening primrose oil, *perilla* oil, peanut oil, tea seed oil, kaya oil, rice bran oil, cinnagyl oil, Japanese tung oil, jojoba oil, germ oil, glyceryl trioctanoate, glyceryl triisopalmitate, horse oil, hardened palm oil, beef tallow, neat's-foot oil, mutton tallow, hardened beef tallow, lard, beef bone fat, Japan wax kernel oil, hardened oil, hardened castor oil, and other fats and oils;

liquid paraffin, vaseline, ceresin, microcrystalline wax, isoparaffin, ozocerite, squalene, pristane, squalane, hydrogenated polyolefin (C6 to 12), and other hydrocarbons;

beeswax, whale wax, lanolin, carnauba wax, candelilla wax, cotton wax, bayberry wax, Chinese insect wax, montan wax, bran wax, lanolin, kapok wax, lanolin acetate, liquid lanolin, sugarcane wax, lanolin fatty acid isopropyl, hexyl laurate, reduced lanolin, jojoba wax, hard lanolin, shellac wax, polyoxyethylene lanolin alcohol ether, polyoxyethylene lanolin alcohol acetate, lanolin fatty acid polyethylene glycol, polyoxyethylene hydrogenated lanolin alcohol ether, and waxes of derivatives thereof;

lauric acid, myristic acid, palmitic acid, stearic acid, isostearic acid, oleic acid, behenic acid, undecylenic acid, lanolin fatty acid, hard lanolin fatty acid, soft lanolin fatty acid, linolic acid, linoleic acid, eicosapentaenoic acid, 12-hydroxystearic acid, and other higher fatty acids;

lauryl alcohol, cetanol, cetostearyl alcohol, isostearyl alcohol, stearyl alcohol, oleyl alcohol, behenyl alcohol, arachidyl alcohol, lanolin alcohol, hydrogenated lanolin alcohol, hexyl decanol, octyl dodecanol, and other higher alcohols;

cholesterol, phytosterol, and other sterols;

isopropyl myristate, butyl stearate, cetyl octanoate, cetyl 2-ethylhexanoate, octyldodecyl myristate, isopropyl palmitate, hexyl laurate, myristyl myristate, decyl oleate, hexyldecyl dimethyloctanoate, cetyl lactate, myristyl lactate, lanolin acetate, isocetyl stearate, isocetyl isostearate, cholesteryl 12-hydroxystearate, ethylene glycol di-2-ethylhexanoate, dipentaerythritol fatty acid ester, N-alkyl glycol monoisostearate, neopentyl glycol dicaprylate, diisostearyl malate, glyceryl di-2-heptylundecanoate, trimethylolpropane tri-2-ethylhexanoate, trimethylolpropane triisostearate, pentaerythritol tetra-2-ethylhexanoate, glyceryl tri-2-ethylhexanoate, trimethylolpropane triisostearate, cetyl-2-ethylhexanoate, 2-ethylhexylpalmitate, glyceryl trimyristate, tri heptyl undecanoate glyceride, castor oil fatty acid methyl ester, oleyl oleate, cetostearyl alcohol, acetoglyceride, 2-heptylundecyl palmitate, diisopropyl adipate, N-lauroyl-L-glutamic acid-2-octyldodecyl ester, di-2-heptylundecyl agipate, ethyl laurate, di-2-ethylhexyl sebacate, 2-hexyldecyl myristate, 2-hexyldecyl palmitate, 2-hexyldecyl agipate, diisopropyl sebacate, 2-ethylhexyl succinate, ethyl acetate, butyl acetate, amyl acetate, triethyl citrate, and other ester oils;

metallic soap, dimethyl polysiloxane, alcohol-modified silicone, methylphenyl polysiloxane, epoxy-modified silicone, fluorine-modified silicone, alkyl-modified silicone, alkoxy-modified silicone, amino-modified silicone, volatile silicone, cyclic silicone and other silicones, as well as polymeric silicone, cyclic silicone, and other silicone-based substances; and lavender oil, bergamot fruit oil, grapefruit peel oil, orange peel oil, lemon peel oil, rosemary oil, and other refined oils.

Any of these may be used alone, or two or more types may be combined.

Moisture-retention components are not limited in any way so long as they can be compounded into cosmetics, and they may be naturally derived or synthesized, and may be liquid or solid. Specific examples include 1,3-butylene glycol, dipropylene glycol, isopentyldiol, propylene glycol, polyethylene glycol, glycerin, diglycerin, sorbitol, 1,2-hexanediol, hexylene glycol, 1,2-pentanediol, trimethyl glycine, trehalose, polyoxyethylene methyl glucoside, xylitol, etc. Any of these may be used alone, or two or more types may be combined.

Surfactants are not limited in any way so long as they can be compounded into cosmetics. Specific examples include glyceryl monostearate, propylene glycol fatty acid ester, glycerin fatty acid ester, polyoxyethylene glycerin fatty acid ester, sorbitan fatty acid ester, sorbitol fatty acid ester, polyoxyethylene sorbitol fatty acid ester, polyethylene glycol fatty acid ester, etc. Any of these may be used alone, or two or more types may be combined.

For thickening agents, various types that are commonly in use may be used. For example, they include: plant-based polymers (such as gum Arabic, tragacanth gum, galactan, guar gum, carob gum, karaya gum, carrageenan, pectin, agar, quince seed (*Cydonia oblonga*), algae colloid (brown algae extract), starch (rice, corn, potato, wheat), glycyrrhizic acid; microbe-based polymers (such as xanthan gum, dextran, succinoglucan, pullulan, etc.); animal-based polymers (such as collagen, casein, albumin, gelatin, hyaluronic acid, etc.) and other natural water-soluble polymers; starch-based polymers (such as carboxymethyl starch, methyl hydroxypropyl starch, etc.); cellulose-based polymers (methyl cellulose, ethyl cellulose, methyl hydroxypropyl cellulose, hydroxyethyl cellulose, sodium cellulose sulfate, hydroxypropyl cellulose, carboxymethyl cellulose, sodium carboxymethyl cellulose, crystalline cellulose, cellulose powder, O-[2-hydroxy-3-(trimethylammonio)propyl] chloride hydroxyethyl cellulose, etc.); alginic acid-based polymers (such as sodium alginate, propylene glycol alginate ester, etc.) and other semi-synthetic water-soluble polymers; vinyl-based polymers (such as polyvinyl alcohol, polyvinyl methyl ether, polyvinyl pyrrolidone, carboxyvinyl polymer, etc.); polyethyleneimine; cationic polymer; polyoxyethylene decyltetradecyl ether/hexamethylene diisocianate/polyethylene glycol 11000 copolymer; O-[2-hydroxy-3-(trimethylammonio)propyl] chloride locust bean gum; vinyl pyrrolidone/N,N-dimethylaminoethyl methacrylate/stearyl acrylate/tripropylene glycol diacrylate copolymer; synthetic sodium silicate/magnesium and other synthetic water-soluble polymers.

For stabilizers, antioxidants, chelate agents, preservatives, pH buffer solutions, etc., may be compounded. Antioxidants include tocopherol, dibutyl hydroxytoluene, etc. Chelate agents include EDTA/disodium salt, EDTA/calcium/disodium salt, etc. Preservatives include ethyl paraben, propyl paraben, butyl paraben, propynyl iodide butylcarbamate, phenoxyethanol, etc. pH buffer solutions include citric acid, phosphoric acid, citrate, phosphate, etc.

The purpose of use of the agent for enhancing lutein's blue light blocking capacity and cosmetic composition proposed by the present invention is not limited in any way. To be specific, they can be applied for various products such as lotions, skin milk, gels, creams, and hair gel, for example.

EXAMPLES

The present invention is explained below using examples; however, the technical scope of the present invention is not limited by these examples.

It should be noted that, unless otherwise specified, "part(s)" refers to "part(s) by weight" in the examples.

<Confirmation Test for Formation of α-gel Structure 1>
(1) Preparation of Test Samples Example 1A (with Lutein)

(a) 0.5 parts by weight of monocetyl phosphate ester, (b) 0.3 parts by weight of arginine, (d) 3.0 parts by weight of lutein dispersion (lutein concentration 0.05% by weight), and (c) purified water were used to achieve a total quantity of 100 parts by weight. This mixture was heated to approx. 80° C. and agitated, and upon confirming that a uniform solution was achieved, cooled to room temperature (25° C.) under agitation, to obtain a test sample of Example 1A.

Example 1B (without Lutein)

(a) 0.5 parts by weight of monocetyl phosphate ester, (b) 0.3 parts by weight of arginine, and (c) purified water were used to achieve a total quantity of 100 parts by weight. This mixture was heated to approx. 80° C. and agitated, and upon confirming that a uniform solution was achieved, cooled to room temperature (25° C.) under agitation, to obtain a test sample of Example 1B.

Comparative Example 1A (Different Base from Component (b), with Lutein)

(a) 0.5 parts by weight of monocetyl phosphate ester, 0.08 parts by weight of potassium hydroxide, (d) 3.0 parts by weight of lutein dispersion (lutein concentration 0.05% by weight), and (c) purified water were used to achieve a total quantity of 100 parts by weight. This mixture was heated to approx. 80° C. and agitated, and upon confirming that a uniform solution was achieved, cooled to room temperature (25° C.) under agitation, to obtain a test sample of Comparative Example 1A.

Comparative Example 1B (Different Base from Component (b), without Lutein)

(a) 0.5 parts by weight of monocetyl phosphate ester, 0.08 parts by weight of potassium hydroxide, and (c) purified water were used to achieve a total quantity of 100 parts by weight. This mixture was heated to approx. 80° C. and agitated, and upon confirming that a uniform solution was achieved, cooled to room temperature (25° C.) under agitation, to obtain a test sample of Comparative Example 1B.

(2) Method for Confirming Formation of α-gel Structure

Regarding the method for confirming formation of an α-gel structure, the aforementioned test samples (Examples 1A and 1B, Comparative Examples 1A and 1B) may be checked by x-ray scattering measurement as described in prior art literatures (such as International Patent Laid-open No. 2009/016989, paragraph [0043], etc.).

On observing each test sample, a "○" was given when formation of an α-gel structure was confirmed, or a "X" was given when it was not confirmed, with the result shown in Table 1 below together with the composition of each test sample. In Table 1, the numbers indicate parts by weight.

TABLE 1

|  |  | Example 1 | | Comparative Example 1 | |
|---|---|---|---|---|---|
|  | Components | A | B | A | B |
| Component (a) | Monocetyl phosphate ester | 0.5 | 0.5 | 0.5 | 0.5 |
| Component (b) | Arginine | 0.3 | 0.3 | — | — |
|  | Potassium hydroxide | — | — | 0.08 | 0.08 |
| Component (d) | Lutein dispersion (lutein content) | 3(0.15) | — | 3(0.15) | — |
| Component (c) | Purified water | Remainder | Remainder | Remainder | Remainder |
| Total |  | 100 | 100 | 100 | 100 |
| Formation of α-gel structure |  | ○ | ○ | x | x |

As shown in Table 1, the test samples of Examples 1A and 1B containing component (a) to (c) conforming to the present invention were confirmed to form an α-gel structure regardless of compounding of lutein. On the other hand, neither of the test samples of Comparative Examples 1A and 1B containing potassium hydroxide which is different from component (b) conforming to the present invention, was confirmed to form an α-gel structure.

<Confirmation Test for Formation of α-Gel Structure 2>

(1) Preparation of Test Samples

Test samples (Examples 2A and 2B, Comparative Examples 2A and 2B) were prepared according to the formulas shown in Table 2 below in the same manner as in "Confirmation Test for Formation of α-gel Structure 1" above.

(2) Method for Confirming Formation of α-Gel Structure

In the same manner as in "Confirmation Test for Formation of α-gel Structure 1" above, each test sample was observed and a "○" was given when formation of an α-gel structure was confirmed, or a "X" was given when it was not confirmed, with the result shown in Table 2 below together with the composition of each test sample. In Table 2, the numbers indicate parts by weight.

TABLE 2

| | | Example 2 | | Comparative Example 2 | |
|---|---|---|---|---|---|
| Components | | A | B | A | B |
| Component (a) | Monocetyl phosphate ester | 10 | 10 | 10 | 10 |
| Component (b) | Arginine | 6 | 6 | — | — |
| | Potassium hydroxide | — | — | 1.6 | 1.6 |
| Component (d) | Lutein dispersion (lutein content) | 3(0.15) | — | 3(0.15) | — |
| Component (c) | Purified water | Remainder | Remainder | Remainder | Remainder |
| Total | | 100 | 100 | 100 | 100 |
| Formation of α-gel structure | | ○ | ○ | x | x |

As shown in Table 2, the test samples of Examples 2A and 2B containing components (a) to (c) conforming to the present invention, which represent compositions containing 20 times components (a) and (b) compared to Examples 1A and 1B, were confirmed to form an α-gel structure regardless of compounding of lutein. On the other hand, neither of the test samples of Comparative Examples 2A and 2B was confirmed to form an α-gel structure, just like the test samples of Comparative Examples 1A and 1B.

<Confirmation Test for Formation of α-Gel Structure 3>

(1) Preparation of Test Samples

Test samples (Examples 3A, 3B, 4A, and 4B, Comparative Examples 3A, 3B, 4A, and 4B) were prepared according to the formulas shown in Table 3 below in the same manner as in "Confirmation Test for Formation of α-gel Structure 1" above.

(2) Method for Confirming Formation of α-Gel Structure

In the same manner as in "Confirmation Test for Formation of α-gel Structure 1" above, each test sample was observed and a "○" was given when formation of an α-gel structure was confirmed, or a "X" was given when it was not confirmed, with the result shown in Table 3 below together with the composition of each test sample. In Table 3, the numbers indicate parts by weight.

TABLE 3

| | | Example 3 | | Comparative Example 3 | | Example 4 | | Comparative Example 4 | |
|---|---|---|---|---|---|---|---|---|---|
| Components | | A | B | A | B | A | B | A | B |
| Component (a) | Monocetyl phosphate ester | 0.5 | 0.5 | 0.5 | 0.5 | 0.5 | 0.5 | 0.5 | 0.5 |
| Component (b) | Arginine | 0.3 | 0.3 | — | — | 0.3 | 0.3 | — | — |
| | Potassium hydroxide | — | — | 0.08 | 0.08 | — | — | 0.08 | 0.08 |
| Component (d) | Lutein dispersion (lutein content) | 0.05 (0.0025) | — | 0.05 (0.0025) | — | 0.1 (0.005) | — | 0.1 (0.005) | — |
| Component (c) | Purified water | Remainder | Remainder | Remainder | Remainder | Remainder | Remainder | Remainder | Remainder |
| Total | | 100 | 100 | 100 | 100 | 100 | 100 | 100 | 100 |
| Formation of α-gel structure | | ○ | ○ | x | x | ○ | ○ | x | x |

As shown in Table 3, the test samples of Examples 3B and 4B, including those of Examples 3A and 4A with reduced compounding quantities of lutein, were also confirmed to form an α-gel structure. Meanwhile, the test samples of Comparative Examples 3A, 3B, 4A, and 4B were confirmed not to form an α-gel structure.

<Confirmation Test for Formation of α-Gel Structure 4>
(1) Preparation of Cosmetic Composition Test Samples Example 5A (a) 0.5 parts by weight of monocetyl phosphate ester, 2.0 parts by weight of lipophilic surfactant, 14.0 parts by weight of oil component (higher alcohol, ester oil, hydrocarbon, etc.), and 0.1 parts by weight of aromatic essential oil were heated to approx. 80° C. and agitated into a uniform solution (I).

(b) 0.3 parts by weight of arginine, (d) 3.0 parts by weight of lutein dispersion (lutein concentration 0.05% by weight), 13.0 parts by weight of moisture-retention component, 0.6 parts by weight of stabilizer (antioxidant, chelate agent, preservative, pH buffer solution, etc.), and (c) purified water were used to achieve a total quantity of 100 parts by weight, and this mixture was heated to approx. 80° C. and agitated into a uniform solution (II).

Solution (I) and solution (II) above were emulsified with a Homo Mixer, and then cooled to room temperature (25° C.) under agitation, thereby obtaining a cosmetic composition test sample of Example 5A.

Similarly, cosmetic composition test samples (Examples 5B, 6A, and 6B, Comparative Examples 5A, 5B, 6A, and 6B) were prepared according to the formulas shown in Table 4 below.

(2) Method for Confirming Formation of α-Gel Structure

In the same manner as in "Confirmation Test for Formation of α-gel Structure 1" above, each cosmetic composition test sample was observed and a "○" was given when formation of an α-gel structure was confirmed, or a "X" was given when it was not confirmed, with the result shown in Table 4 below together with the composition of each cosmetic composition test sample. In Table 4, the numbers indicate parts by weight.

As shown in Table 4, the cosmetic composition test samples of Examples 5A, 5B, 6A, and 6B were also confirmed to form an α-gel structure. Meanwhile, the cosmetic composition test samples of Comparative Examples 5A, 5B, 6A, and 6B were confirmed not to form an α-gel structure.

<Confirmation Test for Effect of Enhancing Blue Light Blocking Capacity>
(1) Method for Measuring Blue Light Percent Transmittances of Test Samples for Each Wavelength The test samples of Examples 1 to 4 and Comparative Examples 1 to 4 were filled in 1-cm square cells, respectively, for use as samples. Also, the test samples of Examples 5 and 6 and Comparative Examples 5 and 6 were adjusted to a thickness of 20 μm using dedicated cells, respectively, for use as samples.

The aforementioned samples were measured for percent transmittance (% T) of wavelengths of 380 to 500 nm using a UV-visible/near-infrared spectrophotometer (V-770DS, manufactured by JASCO Corporation) and integrating sphere ISN-923. Each sample was measured three times and their average was used as the percent transmittance (% T).

(2) Method for Calculating Rate of Enhancement of Blue Light Blocking Capacity

The method for calculating the rate of enhancement of blue light blocking capacity is explained using the percent transmittances (% T) of the wavelength of 450 nm for Example 5 and Comparative Example 5 as examples.

Percent transmittance (% T) of Example 5A (with lutein): 88.45

Percent transmittance (% T) of Example 5B (without lutein): 89.56

Based on the aforementioned results, the degree of decrease in the percent transmittance (% T) of the wavelength of 450 nm by the α-gel structure attributable to the addition of lutein, or specifically the degree of increase in the blocking capacity of the wavelength of 450 nm by the α-gel structure attributable to the addition of lutein, is "89.56–88.45=1.11."

Percent transmittance (% T) of Comparative Example 5A (with lutein): 88.69

TABLE 4

| | | | Example 5 | | Comparative Example 5 | | Example 6 | | Comparative Example 6 | |
|---|---|---|---|---|---|---|---|---|---|---|
| | Components | | A | B | A | B | A | B | A | B |
| (I) | Component (a) | Monocetyl phosphate ester | 0.5 | 0.5 | 0.5 | 0.5 | 10 | 10 | 10 | 10 |
| | | Surfactant | 2 | 2 | 2 | 2 | 2 | 2 | 2 | 2 |
| | | Oil component | 14 | 14 | 14 | 14 | 14 | 14 | 14 | 14 |
| (II) | Component (b) | Arginine | 0.3 | 0.3 | — | — | 6 | 6 | — | — |
| | | Potassium hydroxide | — | — | 0.12 | 0.12 | — | — | 2.4 | 2.4 |
| | Component (d) | Lutein dispersion (concentration 0.05%) | 3(0.15) | | 3(0.15) | | 3(0.15) | | 3(0.15) | |
| | | Moisture-retention component | 13 | 13 | 13 | 13 | 13 | 13 | 13 | 13 |
| | | Stabilizer | 0.6 | 0.6 | 0.6 | 0.6 | 0.6 | 0.6 | 0.6 | 0.6 |
| | Component (c) | Purified water | Remainder | Remainder | Remainder | Remainder | Remainder | Remainder | Remainder | Remainder |
| | Total | | 100 | 100 | 100 | 100 | 100 | 100 | 100 | 100 |
| | Formation of α-gel structure | | ○ | ○ | x | x | ○ | ○ | x | x |

Percent transmittance (% T) of Comparative Example 5B (without lutein): 89.70

Based on the aforementioned results, the degree of decrease in the percent transmittance (% T) of the wavelength of 450 nm attributable to the addition of lutein, or specifically the degree of increase in the blocking capacity of the wavelength of 450 nm attributable to the addition of lutein, is "89.70-88.69=1.01."

The above two of the degree of increase in the blocking capacity of the wavelength of 450 nm shows that the rate of enhancement in the blue light blocking capacity by the α-gel structure at the wavelength of 450 nm is "1.11/1.01×100 109.9%."

Using this method, the rate of enhancement in the blue light blocking capacity at wavelengths of 380 to 500 nm was calculated for the test samples of Examples 1 to 4 and cosmetic composition test samples of Examples 5 and 6, the results of which are summarized in Table 5 below.

Also, FIG. 1 provides a graph showing the blue light percent transmittances (% T), at wavelengths of 380 to 500 nm, of each of the cosmetic composition test samples of Examples 5A and 5B and cosmetic composition test samples of Comparative Examples 5A and 5B.

TABLE 5

| | Wavelength (nm) | 380 | 390 | 400 | 410 | 420 | 430 | 440 |
|---|---|---|---|---|---|---|---|---|
| Example 1A | Rate of | 149.0 | 151.5 | 155.2 | 157.5 | 159.9 | 161.6 | 163.1 |
| Example 2A | enhancement | 124.2 | 128.7 | 130.8 | 132.6 | 133.3 | 133.8 | 134.9 |
| Example 3A | in blue light | 101.8 | 101.9 | 116.2 | 128.8 | 139.7 | 146.9 | 152.8 |
| Example 4A | blocking | 110.2 | 130.9 | 160.5 | 168.1 | 181.7 | 187.0 | 192.1 |
| Example 5A | capacity (%) | 109.8 | 128.7 | 126.5 | 123.7 | 135.9 | 118.4 | 113.9 |
| Example 6A | | 506.2 | 373.3 | 279.1 | 289.6 | 247.3 | 219.9 | 237.8 |

| | Wavelength (nm) | 450 | 460 | 470 | 480 | 490 | 500 |
|---|---|---|---|---|---|---|---|
| Example 1A | Rate of | 164.4 | 165.4 | 166.3 | 167.6 | 168.3 | 166.4 |
| Example 2A | enhancement | 135.4 | 136.4 | 137.0 | 137.5 | 138.4 | 138.4 |
| Example 3A | in blue light | 160.8 | 164.0 | 156.1 | 161.3 | 160.0 | 140.2 |
| Example 4A | blocking | 196.0 | 189.0 | 176.5 | 175.2 | 169.2 | 135.2 |
| Example 5A | capacity (%) | 109.9 | 112.7 | 112.8 | 109.6 | 104.7 | 111.4 |
| Example 6A | | 209.0 | 207.9 | 237.4 | 209.3 | 223.0 | 439.6 |

As shown in Table 5 and FIG. 1, the test samples of Examples 1A to 4A and cosmetic composition test samples of Examples 5A and 6A, which represent specific examples of the present invention, clearly demonstrated an outstanding effect of enhancing blue light blocking capacity.

The detailed mechanism is unclear as to why combining an α-gel structure based on components (a) to (c) conforming to the present invention with lutein enhances the blue light absorbing capacity, that is, blue light blocking capacity, possessed by lutein; it is considered, however, that because the α-gel structure based on components (a) to (c) conforming to the present invention has a regular array, lutein is aligned or oriented with certain regularity, allowing its blue light absorbing capacity to be enhanced.

Furthermore, the cosmetic composition test sample of Example 6A demonstrated an exceptional effect of enhancing blue light blocking capacity. It is considered that this is the outcome of a regular α-gel structure with superior blue light blocking capacity formed as a result of increasing the total quantity of component (a) and component (b) conforming to the present invention while combining them with other components such as surfactant and oil component(s).

It should be noted that, even when alkyl phosphate esters having alkyl groups with 12, 14, 18, 20, 24, 28, 32, and 36 carbon atoms were adopted as component (a) under the present invention, an α-gel structure was confirmed to be formed and an excellent effect of enhancing lutein's blue light blocking capacity obtained, just like with the monocetyl phosphate ester having alkyl groups with 16 carbon atoms used in the aforementioned examples.

Based on these results, the present invention can achieve a superior effect of enhancing blue light blocking capacity and therefore proves useful when applied in cosmetic compositions.

What is claimed:

1. A cosmetic composition containing components (a) to (d) below:
    (a) one or more of alkyl phosphate esters selected from alkyl phosphate esters having alkyl groups with 12 to 36 carbon atoms;
    (b) one or more of substances selected from basic amino acids and organic bases;
    (c) water; and
    (d) lutein,
    wherein an α-gel structure is formed by components (a) to (c).

2. The cosmetic composition according to claim 1, wherein the lutein as component (d) is at least 0.0025% by weight relative to a total quantity of cosmetic composition.

3. The cosmetic composition according to claim 1, containing no higher alcohol.

4. The cosmetic composition according to claim 1, further containing a higher alcohol.

* * * * *